US011893480B1

(12) United States Patent
Riedmiller et al.

(10) Patent No.: US 11,893,480 B1
(45) Date of Patent: Feb. 6, 2024

(54) REINFORCEMENT LEARNING WITH SCHEDULED AUXILIARY CONTROL

(71) Applicant: DeepMind Technologies Limited, London (GB)

(72) Inventors: Martin Riedmiller, Balgheim (DE); Roland Hafner, Balgheim (DE)

(73) Assignee: DeepMind Technologies Limited, London (GB)

( * ) Notice: Subject to any disclaimer, the term of this patent is extended or adjusted under 35 U.S.C. 154(b) by 426 days.

(21) Appl. No.: 16/289,531

(22) Filed: Feb. 28, 2019

(51) Int. Cl.
*G06N 3/08* (2023.01)
*G06N 3/04* (2023.01)
*G06N 7/01* (2023.01)

(52) U.S. Cl.
CPC ............... *G06N 3/08* (2013.01); *G06N 3/04* (2013.01); *G06N 7/01* (2023.01)

(58) Field of Classification Search
CPC ............. G06N 3/08; G06N 3/04; G06N 7/005
See application file for complete search history.

(56) References Cited

PUBLICATIONS

Jaderberg, Max, et al. "Reinforcement learning with unsupervised auxiliary tasks." arXiv preprint arXiv:1611.05397 (2016). https://arxiv.org/abs/1611.05397 (Year: 2016).*
Andrychowicz, Marcin, et al. "Hindsight experience replay." arXiv preprint arXiv:1707.01495 (2017). https://arxiv.org/abs/1707.01495 (Year: 2017).*
Gabel, Thomas, and Martin Riedmiller. "Adaptive reactive job-shop scheduling with reinforcement learning agents." International Journal of Information Technology and Intelligent Computing 24.4 (2008): 14-18. http://citeseerx.ist.psu.edu/viewdoc/download?doi=10.1.1.172.2028&rep=rep1&type=pdf (Year: 2008).*
Cabi, Serkan, et al. "The intentional unintentional agent: Learning to solve many continuous control tasks simultaneously." Conference on Robot Learning. PMLR, 2017. http://proceedings.mlr.press/v78/cabi17a.html (Year: 2017).*
Mirowski, Piotr, et al. "Learning to navigate in complex environments." arXiv preprint arXiv:1611.03673 (2016). https://arxiv.org/abs/1611.03673 (Year: 2016).*
Cabi, Serkan, et al. "The intentional unintentional agent: Learning to solve many continuous control tasks simultaneously." Conference on Robot Learning. PMLR, 2017. http://proceedings.mlr.press/v78/cabi17a/cabi17a.pdf (Year: 2017).*

(Continued)

*Primary Examiner* — Viker A Lamardo
*Assistant Examiner* — Michael H Hoang
(74) *Attorney, Agent, or Firm* — Fish & Richardson P.C.

(57) ABSTRACT

Methods, systems, and apparatus, including computer programs encoded on computer storage media, for reinforcement learning with scheduled auxiliary tasks. In one aspect, a method includes maintaining data specifying parameter values for a primary policy neural network and one or more auxiliary neural networks; at each of a plurality of selection time steps during a training episode comprising a plurality of time steps: receiving an observation, selecting a current task for the selection time step using a task scheduling policy, processing an input comprising the observation using the policy neural network corresponding to the selected current task to select an action to be performed by the agent in response to the observation, and causing the agent to perform the selected action.

17 Claims, 5 Drawing Sheets

(56) References Cited

PUBLICATIONS

Moradi, Milad. "A centralized reinforcement learning method for multi-agent job scheduling in Grid." 2016 6th International Conference on Computer and Knowledge Engineering (ICCKE). IEEE, 2016. https://ieeexplore.ieee.org/stamp/stamp.jsp?tp=&arnumber=7802135 (Year: 2016).*

Chen, Weijia, Yuedong Xu, and Xiaofeng Wu. "Deep reinforcement learning for multi-resource multi-machine job scheduling." arXiv preprint arXiv:1711.07440 (2017). https://arxiv.org/ftp/arxiv/papers/1711/1711.07440.pdf (Year: 2017).*

Riedmiller et al., "Learning by Playing—Solving Sparse Reward Tasks from Scratch," arXiv, Feb. 2018, 18 pages.

Youtube.com [online], "Learning by Playing - Solving Sparse Reward Tasks from Scratch," Jun. 2018, published on or before Oct. 7, 2019, retrieved from URL<https://www.youtube.com/watch?v=mPKyvocNe_M&feature=youtu.be>, 3 pages.

* cited by examiner

```
Sample an experience tuple from the training data
302
                    │
                    ▼
Determine an update to the parameter values of each of the policy
neural networks using the batch experience tuples
304
                    │
                    ▼
Apply the update to the current parameter values of the neural
networks
306
```

REINFORCEMENT LEARNING WITH SCHEDULED AUXILIARY CONTROL

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for the received input. Some neural networks are deep neural networks that include one or more hidden layers in addition to an output layer. The output of each hidden layer is used as input to the next layer in addition to an output layer. The output of each hidden layer is used to the next layer in the network, i.e., the next hidden layer or the output layer. Each layer of the network generates an output from a received input in accordance with current values of a respective set of parameters.

SUMMARY

In general, one innovative aspect of the subject matter described in this specification can be embodied in a method that includes maintaining data specifying parameter values for the primary policy neural network and one or more auxiliary neural networks, each auxiliary neural network used to select actions to be performed by the agent to cause the agent to perform a respective auxiliary task that is different from the primary task; at each of a plurality of selection time steps during a training episode comprising a plurality of time steps: receiving an observation characterizing a current state of the environment at the selection time step, selecting, from the primary task and the one or more auxiliary tasks, a current task for the selection time step using a task scheduling policy, processing an input comprising the observation using the policy neural network corresponding to the selected current task to select an action to be performed by the agent in response to the observation, causing the agent to perform the selected action, in response to the agent performing the selected action, obtaining a respective reward for each of the tasks, generate an experience tuple comprising data identifying the observation, the selected action, and the respective rewards for the each of the tasks, and adding the experience tuple to training data for the primary policy neural network and the auxiliary policy neural networks.

Particular embodiments of the subject matter described in this specification can be implemented so as to realize one or more of the following advantages.

Many reinforcement learning tasks, e.g., tasks that involve a robot interacting in a real-world environment, require the agent to discovering a sparse reward signal. This is a difficult exploration problem for which success via random exploration is highly unlikely. Conventional approaches including shaping of rewards, transfer of learning policies from simulation to reality, learning from demonstrations, learning with model guidance and so on rely on the availability of prior knowledge that is specific to a task. However, the described techniques enable learning of complex behaviors—from scratch—in the presence of multiple sparse reward signals. Conventional approaches mainly consider using auxiliary tasks to provide additional learning signals and additional exploration by following random sensory goals; the described techniques, on the other hand, make active use of the auxiliary tasks by switching between them throughout the individual episodes, in order to achieve exploration for the main task. Conventional approaches also bias the control policy in a certain—potentially suboptimal—direction. For example, using a shaped reward designed by the experimenter, inevitably, biases the solutions that the agent can find. In contrast to this, the described techniques preserve the ability of the agent to learn from sparse rewards, improving the training process and the performance of the trained agent. Thus, a primary task neural network can be trained over fewer training iterations, i.e., while consuming fewer computational resources (processor cycles and memory) and less wall clock time, while having improved performance after training to conventional approaches.

The details of one or more embodiments of the subject matter of this specification are set forth in the accompanying drawings and the description below. Other features, aspects and the advantages of the subject matter will become apparent from the description, the drawings and the claims.

DETAILED DESCRIPTION OF FIGURES

Like reference numbers and designations in the various drawings indicate like elements.

DETAILED DESCRIPTION

Figure 1:
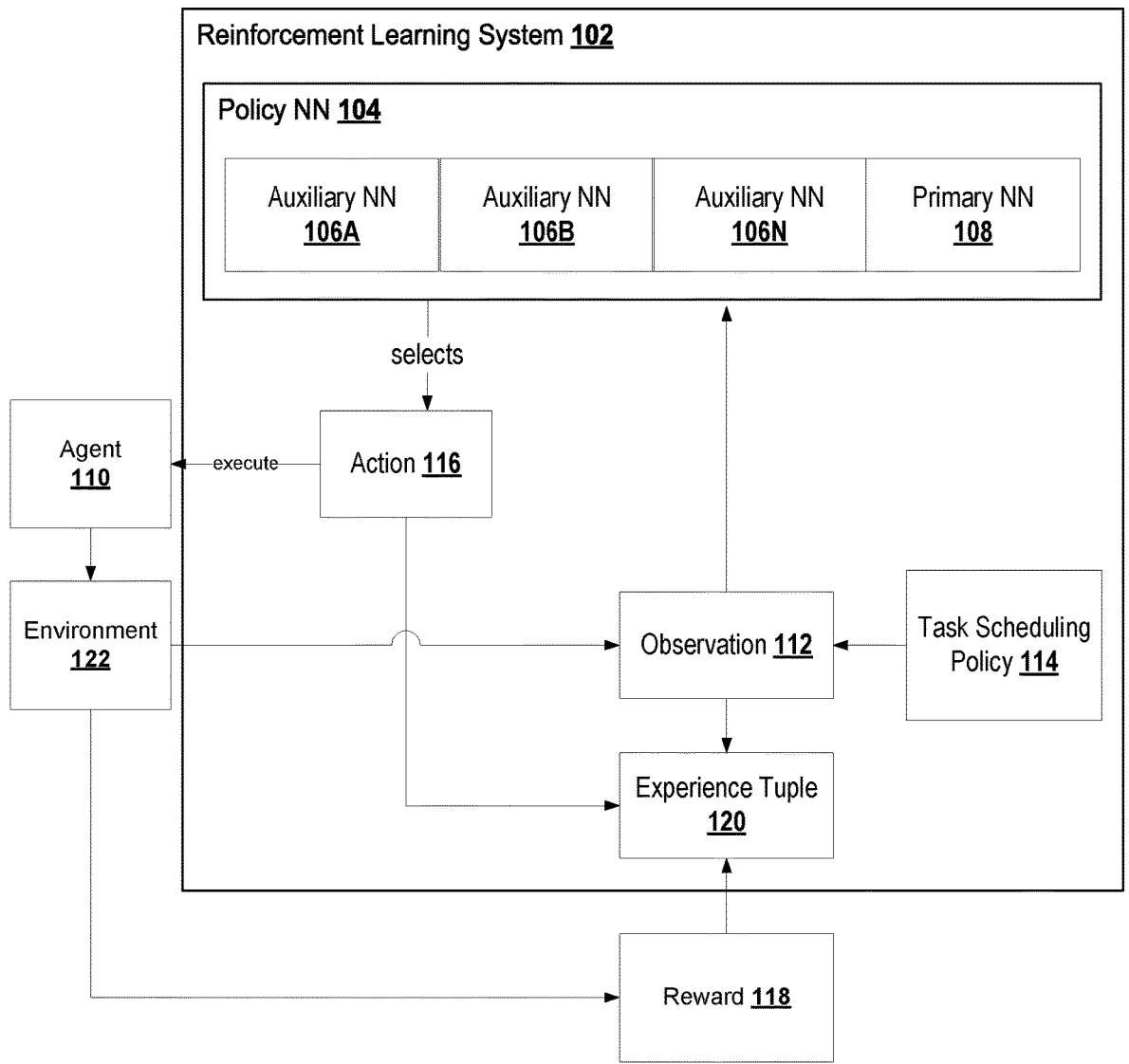
FIG. 1 is a block diagram of an example reinforcement learning system.

FIG. 1 shows an example reinforcement learning system 102. The reinforcement learning system 102 is an example of a system implemented as computer programs on one or more computers in one or more locations in which the systems, components and techniques described below are implemented.

The reinforcement learning system 102 selects actions that are executed by an agent 110 interacting with an environment 122. In particular, the system 102 selects actions to cause the agent 110 to perform a primary task while interacting with the environment 122. For example, the task might be to control the agent to navigate to a particular location in the environment 122, to locate a particular object in the environment, or to move an object from one location to another in the environment.

At a given time step during the interaction of the agent with the environment, the system 102 receives an observation characterizing a current state of the environment, selects an action to be performed by the agent in response to the observation, causes the agent to execute the selected action, and receives a reward value that measures the progress of performing the selected action in successfully performing the primary task. Thus, the primary task is successfully performed when the total reward, e.g., a time-discounted sum of reward values, received as a result of the interactions of the agent is maximized.

To select an action to be executed by the agent, the system uses a set of policy neural networks 104.

The set of policy neural networks 104 includes a primary neural network 108 that corresponds to the primary task and can be used to control the agent to perform the primary task. The primary neural network 108 is configured to receive an input that includes an observation and to process the input in accordance with a set of parameters (referred to in this specification as "primary network parameters") to generate an output that can be used to select an action to be performed by the agent.

In some cases, the primary neural network generates a network output that includes, for each action of a set of possible actions that can be performed by the agent, a respective Q-value, i.e., an estimate of a return received if the reinforcement learning agent performs the action in response to the observation. In these cases, the system can select the action having the highest Q value or can select the highest Q value with probability 1−ε and a random action with probability ε.

In some other cases, the network output defines a likelihood distribution over the actions in the set of possible actions. For example, when the set of actions is finite, the network output can include a respective likelihood for each action in the set. When the set of actions is continuous, the network output can include parameters of a distribution over the set of actions, e.g., the mean and the variance. In these cases, the system can select an action by sampling an action from the likelihood distribution or selecting the action with the highest likelihood.

In yet other cases, the network output identifies an action from the set of possible actions. For example, when the actions are points in a continuous action space, the action can be a point in the space. In these cases, the system can select an action by selecting the identified action or by adding noise to the identified action and selecting the noisy action.

In order for the primary neural network 108 to be effectively used to control the agent to perform the primary task, the system 102 trains the primary neural network 108 to update the values of the primary network parameters.

However, rewards for the primary task can be sparse, i.e., can only be non-zero at a small fraction of the time steps that occur during interaction of the agent with the environment. This sparsity makes it difficult to train.

In order to improve the training of the primary neural network 108, the system 102 trains the primary neural network 108 jointly with a set of one or more auxiliary policy neural networks 106A-N. Each of the one or more auxiliary neural networks 106 correspond to an auxiliary task that is different from the primary task and that may have a different reward distribution from the primary task, i.e., may have rewards that are less sparse or rewards that are non-zero at different environment states than the primary task. Examples of auxiliary tasks include determining whether any object in the environment moved between time steps or whether two objects in the environment are close to each other in the image plane.

Each of the auxiliary neural networks generates the same kind of output as the primary neural network and, in some cases, the auxiliary neural networks and the primary neural network share some parameters. An example architecture for the auxiliary neural networks and the primary neural network where the network share some parameters is described below with reference to FIG. 5.

In some implementations, the primary task and the auxiliary tasks all operate on the same type of observation, e.g., raw sensor data or pre-processed sensor data.

In some other implementations, more expensive feature data is available during training but will not be available after training. In these implementations, to leverage this availability, one or more auxiliary tasks operate on different types of observations from the primary task, i.e., on observations that include the additional features. For example, observations can include raw sensor data (such as images), proprioceptive features (such as joint angles), and expensive auxiliary features, e.g., those generated using an object tracking system. In this example, some auxiliary tasks can operate on observations that include raw sensor data, the proprioceptive features, and the expensive auxiliary features while the main task operates on observations that include only the raw sensor data or only the sensor data and the proprioceptive features. By making use of the expensive auxiliary features when they are available during training, the auxiliary neural networks can learn the corresponding auxiliary tasks faster, improving the performance of the primary neural network after training even though the primary neural network does not operate on the auxiliary features during or after training.

The system can implement different observation types for different tasks by maintaining respective masking data for each of the tasks. The masking data for each tasks masks out, i.e., sets to zero or some other pre-determined placeholder value, all data that is not of the type or types that the task operates on. For example, the masking data for the primary task can mask out the auxiliary features. The policy neural network for each task then receives as input the masked observation, i.e., the observation after the mask has been applied. In cases where the networks share parameters, the networks can include task-specific parameters that map the masked observation for the task to a shared feature space and shared parameters that operate on the observations after they have been mapped to the shared feature space.

At any given time step during the training of the primary neural network 108, the system 102 selects the action to be performed by the agent using either the primary neural network 108 or one of the auxiliary neural networks 106 A-N.

In particular, at any given time step during the training, the system 102 selects a neural network in accordance with a task scheduling policy 114 and then uses the selected neural network to select the action to be performed by the agent. Thus, because each neural network correspond to a different task, depending on which neural network is selected, the system may cause the agent to attempt to perform an auxiliary task instead of the primary task. Selecting a neural network in accordance with the task scheduling policy will be described in more detail below with reference to FIG. 4.

Once the system has selected the action, the system causes the agent to execute the selected action and, in response, receives a reward 118. The reward 118 includes respective reward values for the primary task and for each of the auxiliary tasks. The reward value for a given task is a numeric value that measures the progress in successfully performing the given task as a result of performing the selected action.

The system 102 can generate an experience tuple 120 that includes the observation 112 and the reward 118 and add the experience tuple 120 to training data that is used to update the parameter values of the primary neural network and the auxiliary neural networks.

To train the primary neural network and the auxiliary neural networks, the system can sample a batch of experience tuples 120 from the training data and determine updates to the parameter values of each of the neural networks using the experience tuples in the batch. Training the primary neural network and the auxiliary neural networks will be described in more detail below with reference to FIG. 3.

Figure 2:
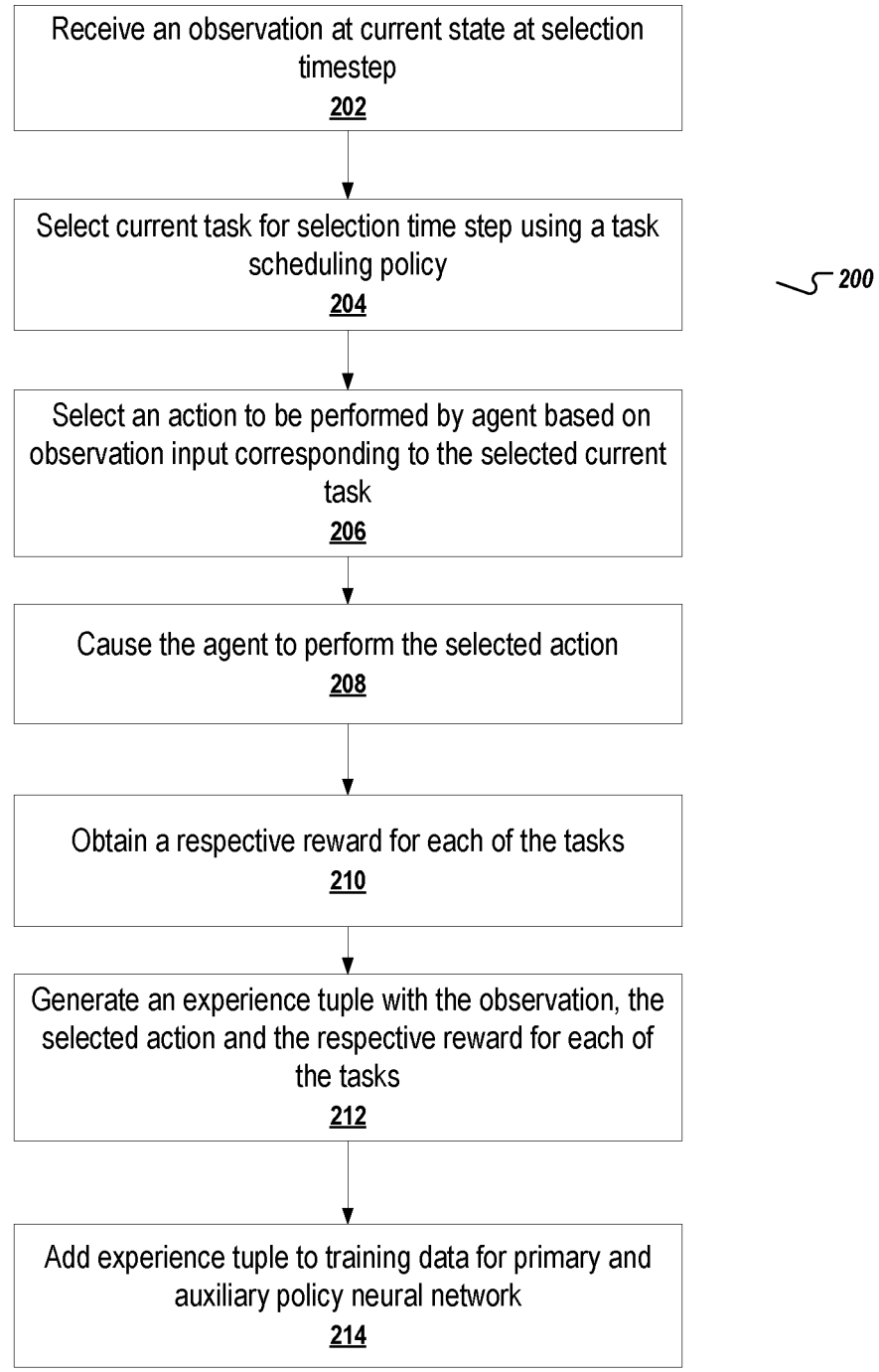
FIG. 2 is an example flow diagram of a process for selecting an action to be performed by the agent at a time step.

FIG. 2 is a flow diagram of an example process for selecting an action to be performed by the agent at a time step. For convenience, the process 200 will be described as being performed by a system of one or more computers located in one or more locations. For example, a reinforcement learning system, e.g., the reinforcement learning system 102 of FIG. 1, appropriately programmed in accordance with this specification, can perform the process 200.

The system receives an observation characterizing the current state of the environment at the time step (Step 202).

The system selects a current task for the time step (Step 204). In particular, the system determines whether the current time step is a selection time step. For example, the system can designate time steps as selection time steps at predetermined intervals. That is, if $\epsilon$ denote the period at which the system can switch between tasks, if the time step number divided by $\epsilon$ results in a zero remainder, the system can designate the current time step as a selection time step and choose a new task. If the current time step is not a selection time step, the system selects as the current task for the time step the task that was selected at the preceding time step. If the current time step is a selection time step, the system selects the current task using a task scheduling policy.

In some implementations, the system randomly selects a task from the set of tasks at each selection time steps, i.e., the task scheduling policy is a random policy. In other implementations, the task scheduling policy is not random and is instead adjusted during the training of the neural networks. How the task scheduling policy is used to select a task for the current time step in these implementations is described in more detail below with reference to FIG. 4.

The system selects an action to be performed by the agent using the policy neural network corresponding to the selected current task for the time step (Step 206). That is, the system processes an input that includes the observation at the time step using the auxiliary or primary neural network corresponding to the selected task and uses the output of the neural network to select the action to be performed by the agent.

The system causes the agent to perform the selected action (Step 208). For example, the system can instruct the agent to perform the selected action or can transmit a control signal to a control system for the agent.

The system obtains a reward that includes a respective reward value for each of the tasks in response to the agent executing the select action (Step 210). That is, after the agent executes the selected action, the environment provides rewards for all of the tasks in the set of tasks. In other words, no matter which task is selected at a given time step, the system receives rewards for all of the tasks.

The system generates an experience tuple that includes the observation, the selected action and the respective reward value for each of the tasks (Step 212).

The system adds the experience tuple to training data for the primary and auxiliary policy neural networks (Step 214).

Independently from selecting actions, the system can then sample a batch of experience tuples from the training data and use the experience tuples in the batch to train the primary and auxiliary policy neural networks. Training the primary and auxiliary policy neural network is described below with reference to FIG. 3.

Figure 3:
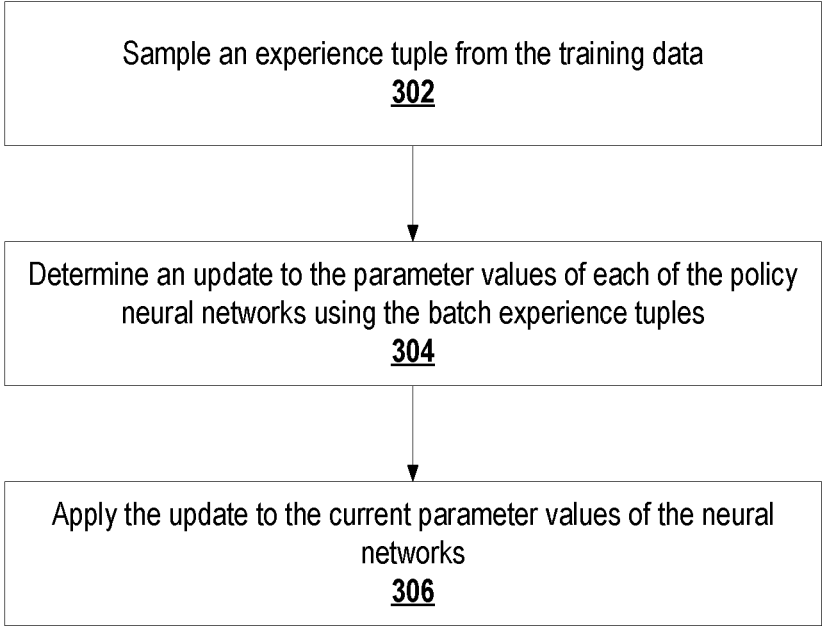
FIG. 3 is an example flow diagram of a process for training the primary and auxiliary policy neural network parameters from an experience tuple.

FIG. 3 is a flow diagram of an example process 300 for training the primary and auxiliary policy neural networks. For convenience, the process 300 will be described as being performed by a system of one or more computers located in one or more locations. For example, a reinforcement learning system, e.g., the reinforcement learning system 102 of FIG. 1, appropriately programmed in accordance with this specification, can perform the process 300.

The system samples an experience tuple from the training data (Step 302). The experience tuple includes an observation, the selected action in response to the observation, and the respective reward value for each of the tasks received in response to the agent performing the selected action.

The system determines an update to the parameter values of each of the policy neural networks using the experience tuple (step 304).

In particular, for each policy neural network, the system determines an update to the parameters of the policy network using the reward value for the task corresponding to the policy neural network using a reinforcement learning technique. Thus, the system determines an update to the parameters of each policy network, and not just to the parameters of the policy network used to select the action in the experience tuple.

For a given policy network, the system can determine the updates for the parameters of the policy networks from the reward value for the task corresponding to the policy network using any reinforcement learning technique that is appropriate for the policy neural network, i.e., that can be employed to train a neural network that generates an output of the kind that is generated by the policy neural network. Examples of reinforcement learning techniques that can be used include a proximal policy optimization (PPO) algorithm, a deep deterministic policy gradients (DDPG) algorithm, an asynchronous actor-critic (A3C) algorithm, a deep Q-networks (DQN) algorithm, and a Double DQN algorithm.

In some cases, the system also uses one or more other neural networks to train a given policy neural network. For example, the system can train each policy neural network jointly with a corresponding critic neural network if such joint training is required by the reinforcement learning technique.

The system applies the update to the parameter values of the neural networks (Step 306). For example, the system can compute a respective set of updates for each experience tuple in a batch of experience tuples and then apply the updates for the tuples in accordance with an update rule for the reinforcement learning technique, e.g., an Adam update rule, an rmsProp update rule, or an SGD update rule.

Figure 4:
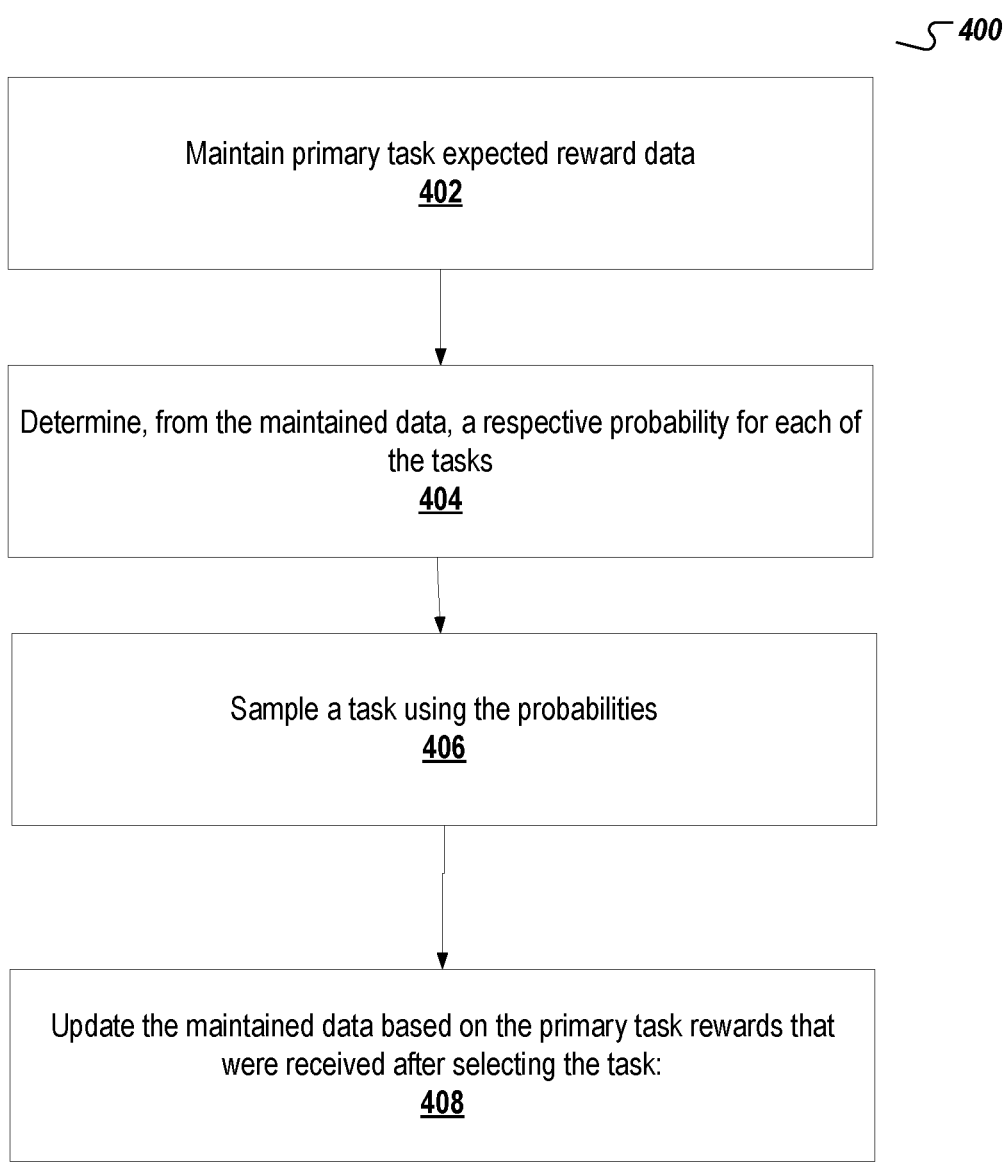
FIG. 4 is an example flow diagram of a process for selecting a task and updating the scheduling policy.

FIG. 4 is flow diagram of an example process 400 for selecting a task and updating the scheduling policy. For convenience, the process 400 will be described as being performed by a system of one or more computers located in one or more locations. For example, a reinforcement learning system, e.g., the reinforcement learning system 102 of FIG. 1, appropriately programmed in accordance with this specification, can perform the process 400.

The system maintains primary task expected reward data for each of the plurality of tasks (step 402).

The primary task expected reward data for a given task identifies, for each of a set of possible earlier task selections, an estimate of the total primary task reward that would be received if the given task is selected as the current task after the earlier task selections have been made. An estimate of the total primary task reward is a combination, e.g., a time-discounted sum, of the total rewards that would be received for the primary task starting from the time step at which the task is being selected.

For example, the system can maintain data defining a table. Each row can represent a different sequence of task selections and each column can represent a different task in the plurality of tasks. A given entry in row i and column j in the table can represent an estimate of the total primary task reward received if the task represented by column j is selected as the next task after the sequence of task selections represented by row i.

The system determines, from the maintained data, a respective probability for each of the tasks (step 404). In particular, the system determines, from the maintained data and for each task in the plurality of tasks, a respective primary reward value given the sequence of tasks that have already been selected at earlier selection time steps. The system then assigns probabilities to the tasks so that tasks with higher primary reward values have higher probabilities. For example, the probability for a task i at a selection time step h given the tasks selected at selection time steps 1 through h-1 can satisfy:

$$P_S(T_i \mid T_{1:h-1}; n) = \frac{\exp(Q_i/n)}{\sum_j \exp(Q_j/n)},$$

where $Q_i$ is the estimate for task i given the sequence of tasks selected at time steps 1 through h-1 and the sum is over all of the tasks in the set of tasks and n is a positive constant value.

The system selects a task by sampling a task from the set of tasks in accordance with the respective probabilities (step 406). Thus, tasks that have higher probabilities are sampled more frequently while tasks with lower probabilities may still be sampled but with lower probability.

The system updates the maintained data based on the primary task rewards that were received after the selected task was selected (step 408).

The reward accumulated after selecting the task is used to update the maintained reward data. In particular, the system determines the actual total reward for the primary task that was received for the remainder of the task episode after the task was selected. If the selected task is task j and the earlier sequence of selections corresponds to row j, the system can update the corresponding estimate at row i and column j to move the estimate towards the actual total reward. For example, the system can calculate the difference between the actual reward and the current estimate and divide the difference by the number of updates to the scheduling policy. The system can then add the adjusted difference to the current estimate to obtain the updated estimate. Thus, if the scheduling policy had been updated multiple times, the current reward from the current task will have a minimal impact on the current table value; whereas, if the scheduling policy had only been updated a few times, the reward for the chosen task will greatly influence the resulting table values.

Figure 5:
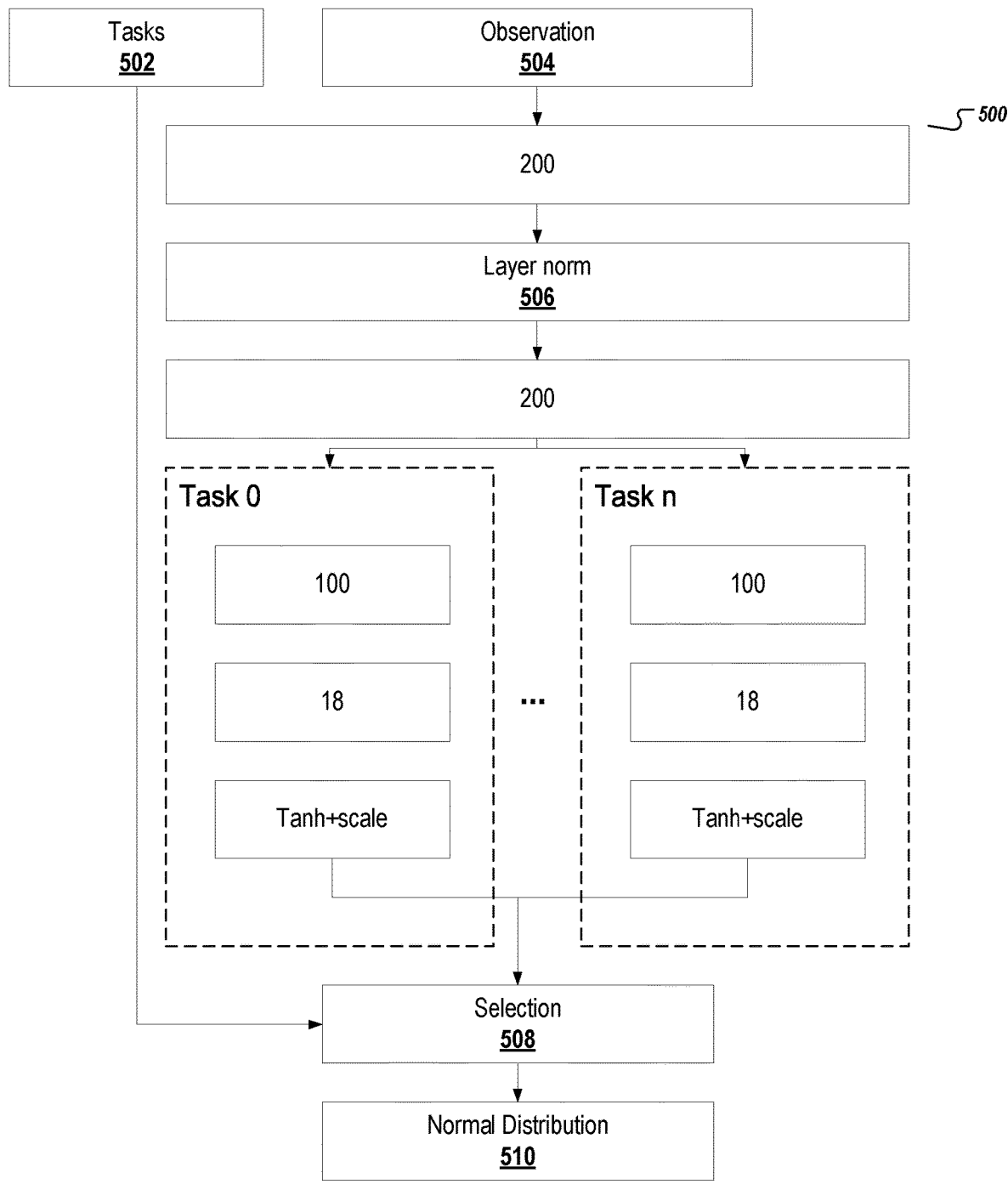
FIG. 5 is a block diagram of an example architecture for the primary and auxiliary neural networks.

FIG. 5 shows an example architecture for the primary and auxiliary neural networks.

A shared network architecture is used to instantiate the policy 512 for different tasks 502. The tasks 502 correlate to one or more auxiliary neural networks and the primary neural network.

By sharing parameters between the auxiliary and primary neural network the most optimal actions can be chosen by the primary neural network.

In the example of FIG. 5, an observation is used as input to a layer of 200 hidden units, including ELU units.

The output of the 200 hidden units layer is normalized by the LayerNorm 506. This is beneficial when switching between different environments that have different scaled observations 504.

The LayerNorm 506 output is fed to a second shared layer with 200 ELU units. The output of the shared stack is routed to task-specific blocks. Each task-specific block includes a layer of 100 ELU units followed by a layer of 18 ELU units followed by a final tanh activation. A task is selected 508 by the scheduling policy and the output of the corresponding task-specific block is used to generate a normally distributed output 510. That is, in the example of FIG. 5, each of the task neural networks generate an output that defines a distribution over possible actions, e.g., generate parameters of a multi-variate normal distribution over the action space for the agent.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method of training a primary policy neural network used to select actions performed by an agent interacting with an environment to cause the agent to perform a primary task, the method comprising:
   maintaining data specifying parameter values for the primary policy neural network and one or more auxiliary policy neural networks, wherein each auxiliary policy neural network is configured to select actions to be performed by the agent to cause the agent to perform a respective auxiliary task that is different from the primary task;
   maintaining data specifying, for each of a plurality of tasks that includes the primary task and each of the one or more auxiliary tasks, a respective reward estimate, wherein the respective reward estimate for each of the auxiliary tasks is an expected reward for the primary task that would be received after the auxiliary task is selected as a current task at a particular selection time step in a particular training episode given a sequence of one or more tasks that were selected at respective earlier selection time steps in the particular training episode;
   controlling the agent during a training episode comprising a plurality of time steps,
   the controlling comprising, at each of a plurality of selection time steps during the training episode:
      receiving an observation characterizing a current state of the environment at the selection time step,
      selecting, from the primary task and the one or more auxiliary tasks, a current task for the selection time step using a learned task scheduling policy that is applied to the respective reward estimates for the plurality of tasks in the maintained data,
      identifying, from the primary policy neural network and the one or more auxiliary policy neural networks, the policy neural network that corresponds to the selected current task;
      processing an input comprising the observation using the identified policy neural network corresponding to the selected current task to select an action to be performed by the agent in response to the observation,
      causing the agent to perform the selected action,
      in response to the agent performing the selected action, obtaining a respective reward for each of the tasks,
      generating an experience tuple comprising data identifying the observation, the selected action, and the respective rewards for the each of the tasks, and
      adding the experience tuple to training data for the primary policy neural network and the auxiliary policy neural networks;
   updating the learned task scheduling policy using the rewards obtained during the training episode comprising, for each auxiliary task that was selected during the training episode, updating the maintained data for the auxiliary task based on rewards that were obtained for the primary task after the auxiliary task was selected during the task episode;
   sampling an experience tuple from the training data; and
   training each of the policy neural networks using the sampled experience tuple, comprising, for each policy neural network, training the policy neural network using the reward for the corresponding task in the sampled experience tuple.

2. The method of claim 1, wherein updating the learned task scheduling policy using the rewards obtained during the training episode comprises:
   for the respective task selected at each of the plurality of selection time steps, updating the maintained data based on the rewards for the primary task that were obtained while the task was selected.

3. The method of claim 1, wherein the selection time steps occur at predetermined intervals during the training episode.

4. The method of claim 1, further comprising, at each time step in the training episode that is not a selection time step, determining to perform the selected task from the selection time step that occurred most recently to the time step.

5. The method of claim 1, wherein the primary policy neural network and the auxiliary policy neural networks share some parameters.

6. The method of claim 1, wherein selecting the current task using the maintained data comprises:
   determining, from the maintained data, a respective probability for each of the tasks; and
   sampling the current task using the respective probabilities for the tasks.

7. The method of claim 6, wherein, for each task i, the corresponding probability $P_S$ is equal to:

$$P_S(T_i \mid T_{1:h-1}; n) = \frac{\exp(Q_i/n)}{\sum_j \exp(Q_j/n)},$$

wherein h identifies the selection time step, $T_{1:h-1}$ represents the sequence of tasks that were selected at respective earlier selection time steps in the training episode, $T_i$ represents the selection of the task i as the current task for the selection time step, $Q_i$ is the expected reward for the primary task that would be received after the task i is selected as the current task for the selection time step given the sequence of tasks that were selected at respective earlier selection time steps in the training episode, $\Sigma_j$ represents a sum over each task j, and n is a constant positive value.

8. A system comprising one or more computers and one or more storage devices storing instructions that when executed by one or more computers cause the one or more computers to perform operations of training a primary policy neural network used to select actions performed by an agent interacting with an environment to cause the agent to perform a primary task, the operations comprising:

maintaining data specifying parameter values for the primary policy neural network and one or more auxiliary policy neural networks, wherein each auxiliary policy neural network is configured to select actions to be performed by the agent to cause the agent to perform a respective auxiliary task that is different from the primary task;

maintaining data specifying, for each of a plurality of tasks that includes the primary task and each of the one or more auxiliary tasks, a respective reward estimate, wherein the respective reward estimate for each of the auxiliary tasks is an expected reward for the primary task that would be received after the auxiliary task is selected as a current task at a particular selection time step in a particular training episode given a sequence of one or more tasks that were selected at respective earlier selection time steps in the particular training episode;

controlling the agent during a training episode comprising a plurality of time steps, the controlling comprising, at each of a plurality of selection time steps during the training episode:
receiving an observation characterizing a current state of the environment at the selection time step,
selecting, from the primary task and the one or more auxiliary tasks, a current task for the selection time step using a learned task scheduling policy that is applied to the respective reward estimates for the plurality of tasks in the maintained data,
identifying, from the primary policy neural network and the one or more auxiliary policy neural networks, the policy neural network that corresponds to the selected current task;
processing an input comprising the observation using the identified policy neural network corresponding to the selected current task to select an action to be performed by the agent in response to the observation,
causing the agent to perform the selected action,
in response to the agent performing the selected action, obtaining a respective reward for each of the tasks,
generating an experience tuple comprising data identifying the observation, the selected action, and the respective rewards for the each of the tasks, and
adding the experience tuple to training data for the primary policy neural network and the auxiliary policy neural networks;

updating the learned task scheduling policy using the rewards obtained during the training episode comprising, for each auxiliary task that was selected during the training episode, updating the maintained data for the auxiliary task based on rewards that were obtained for the primary task after the auxiliary task was selected during the task episode;

sampling an experience tuple from the training data; and training each of the policy neural networks using the sampled experience tuple, comprising, for each policy neural network, training the policy neural network using the reward for the corresponding task in the sampled experience tuple.

9. The system of claim 8, wherein updating the learned task scheduling policy using the rewards obtained during the training episode comprises:
for the respective task selected at each of the plurality of selection time steps, updating the maintained data based on the rewards for the primary task that were obtained while the task was selected.

10. The system of claim 8, wherein the selection time steps occur at predetermined intervals during the training episode.

11. The system of claim 8, further comprising, at each time step in the training episode that is not a selection time step, determining to perform the selected task from the selection time step that occurred most recently to the time step.

12. The system of claim 8, wherein selecting the current task using the maintained data comprises:
determining, from the maintained data, a respective probability for each of the tasks; and
sampling the current task using the respective probabilities for the tasks.

13. The system of claim 12, wherein, for each task i, the corresponding probability $P_S$ is equal to:

$$P_S(T_i \mid T_{1:h-1}; n) = \frac{\exp(Q_i/n)}{\sum_j \exp(Q_j/n)},$$

wherein h identifies the selection time step, $T_{1:h-1}$ represents the sequence of tasks that were selected at respective earlier selection time steps in the training episode, $T_i$ represents the selection of the task i as the current task for the selection time step, $Q_i$ is the expected reward for the primary task that would be received after the task i is selected as the current task for the selection time step given the sequence of tasks that were selected at respective earlier selection time steps in the training episode, $\Sigma_j$ represents a sum over each task j, and n is a constant positive value.

14. One or more non-transitory computer-readable storage media storing instructions that when executed by one or more computers cause the one or more computers to perform operations of training a primary policy neural network used to select actions performed by an agent interacting with an environment to cause the agent to perform a primary task, the operations comprising:

maintaining data specifying parameter values for the primary policy neural network and one or more auxiliary policy neural networks, wherein each auxiliary policy neural network is configured to select actions to be performed by the agent to cause the agent to perform a respective auxiliary task that is different from the primary task;

maintaining data specifying, for each of a plurality of tasks that includes the primary task and each of the one or more auxiliary tasks, a respective reward estimate, wherein the respective reward estimate for each of the auxiliary tasks is an expected reward for the primary task that would be received after the auxiliary task is selected as a current task at a particular selection time step in a particular training episode given a sequence of one or more tasks that were selected at respective earlier selection time steps in the particular training episode;

controlling the agent during a training episode comprising a plurality of time steps, the controlling comprising, at each of a plurality of selection time steps during the training episode:
receiving an observation characterizing a current state of the environment at the selection time step,
selecting, from the primary task and the one or more auxiliary tasks, a current task for the selection time step using a learned task scheduling policy that is applied to the respective reward estimates for the plurality of tasks in the maintained data,
identifying, from the primary policy neural network and the one or more auxiliary policy networks, the policy neural network that corresponds to the selected current task;
processing an input comprising the observation using the identified policy neural network corresponding to the selected current task to select an action to be performed by the agent in response to the observation,
causing the agent to perform the selected action,
in response to the agent performing the selected action, obtaining a respective reward for each of the tasks,
generating an experience tuple comprising data identifying the observation, the selected action, and the respective rewards for the each of the tasks, and
adding the experience tuple to training data for the primary policy neural network and the auxiliary policy neural networks;
updating the learned task scheduling policy using the rewards obtained during the training episode comprising, for each auxiliary task that was selected during the training episode, updating the maintained data for the auxiliary task based on rewards that were obtained for the primary task after the auxiliary task was selected during the task episode;
sampling an experience tuple from the training data; and
training each of the policy neural networks using the sampled experience tuple, comprising, for each policy neural network, training the policy neural network using the reward for the corresponding task in the sampled experience tuple.

15. The one or more non-transitory computer-readable storage media of claim 14, wherein updating the learned task scheduling policy using the rewards obtained during the training episode comprises:
for the respective task selected at each of the plurality of selection time steps, updating the maintained data based on the rewards for the primary task that were obtained while the task was selected.

16. The one or more non-transitory computer-readable storage media of claim 14, wherein the selection time steps occur at predetermined intervals during the training episode.

17. The one or more non-transitory computer-readable storage media of claim 14, further comprising, at each time step in the training episode that is not a selection time step, determining to perform the selected task from the selection time step that occurred most recently to the time step.

* * * * *